United States Patent [19]
Shelhorse

[11] Patent Number: 5,881,864
[45] Date of Patent: Mar. 16, 1999

[54] DECORATIVE DOORBELL MOUNTING ASSEMBLY

[76] Inventor: Randy M. Shelhorse, 2755 Fowler St., Fort Myers, Fla. 33901

[21] Appl. No.: 976,630

[22] Filed: Nov. 24, 1997

[51] Int. Cl.$^6$ ..................................................... H01K 9/02
[52] U.S. Cl. ............................................. 200/296; 174/53
[58] Field of Search .............................. 200/17 R, 52 R, 200/293, 294, 296, 297, 302.1, 303, 333; 361/600, 627, 628, 631, 632, 673, 679, 829, 832, 837; 174/48, 49, 53, 55, 58, 54, 56, 66, 67

[56] References Cited

U.S. PATENT DOCUMENTS

| | | | |
|---|---|---|---|
| 3,941,915 | 3/1976 | Boghosian | 174/48 |
| 4,499,352 | 2/1985 | Fujita et al. | 200/296 |
| 4,731,511 | 3/1988 | Steinhilber et al. | 200/330 |
| 4,952,760 | 8/1990 | Wilson, Jr. | 200/302.1 |
| 5,291,068 | 3/1994 | Rammel et al. | 307/116 |
| 5,401,925 | 3/1995 | Sambar | 200/296 |

*Primary Examiner*—Michael A. Friedhofer
*Attorney, Agent, or Firm*—William E. Noonan

[57] ABSTRACT

A decorative doorbell apparatus is mounted to a building wall and includes a mounting plate secured to an outside surface of the wall. The plate includes a threaded opening that communicably corresponds with a passageway in the wall. An elongate, exteriorly threaded conduit is interengaged with the opening of the mounting plate. The conduit is received within the passageway and extends outwardly from the plate to a distal end spaced apart from the wall. A decorative member has a hole that receives the conduit such that the decorative member is mounted on the conduit between the plate and the distal end of the conduit. A doorbell switch is releasably engaged with the distal end of the conduit and is operably connected to doorbell wiring. The wiring extends through the conduit and is operably connected to a standard bell mechanism located inside the wall.

16 Claims, 3 Drawing Sheets

DECORATIVE DOORBELL MOUNTING ASSEMBLY

FIELD OF THE INVENTION

This invention relates to a decorative doorbell mounting assembly and, more particularly, to a decorative assembly for mounting a standard doorbell switch or button to the outside surface of the wall such that the switch or button is operably interconnected by doorbell wiring to a bell mechanism located inside the wall.

BACKGROUND OF THE INVENTION

Virtually all homes feature a standard doorbell employing a plain, unadorned button or switch that is mounted to the outside wall of the home adjacent to the door. These doorbells are mundane and fairly unattractive. To date, virtually nothing has been done to decorate or ornament the doorbell switch. There are also no products available which enable the homeowner to quickly and conveniently change doorbell switches to suit his or her personal taste. A need exists for an attractive decorative doorbell, which is convenient to install and which may be readily interchanged and personalized to suit each homeowner's particular aesthetic tastes.

SUMMARY OF INVENTION

It is therefore an object of the present invention to provide a decorative doorbell mounting assembly, which permits an aesthetically attractive doorbell switch to be installed quickly and conveniently in virtually all homes.

It is a further object of this invention to provide a decorative doorbell mounting assembly, which permits each homeowner's doorbell to be personalized to suit that homeowner's individual taste.

It is a further object of this invention to provide a decorative doorbell mounting assembly that permits the decor and design of the doorbell to be quickly and conveniently interchanged as desired.

It is a further object of this invention to provide a decorative doorbell mounting assembly that permits seasonal, holiday and other personalized decorations to be quickly, conveniently and interchangeably attached to the doorbell button, as desired.

It is a further object of this invention to provide a decorative doorbell assembly that is much more aesthetically attractive than standard doorbells.

It is a further object of this invention to provide a decorative doorbell mounting assembly, which may be readily installed by most persons.

This invention results from a realization that an attractive and personalized doorbell apparatus may be achieved by mounting the doorbell button or switch on a conduit, which extends through and outwardly from the wall of the house. The conduit accommodates the doorbell wiring and supports a readily interchangeable decorative member.

This invention features a decorative assembly for mounting a doorbell switch to the outside surface of a building wall such that the switch is operably interconnected by standard doorbell wiring to a standard bell mechanism located inside the wall. The assembly includes a mounting plate that is secured to the outside surface of the wall and has a threaded opening. That opening communicably corresponds with a passageway formed transversely through the wall. An exteriorly threaded conduit is threadably interengaged with the threaded opening in the mounting plate. The conduit is received by the passageway and extends outwardly from the plate to a distal end spaced apart from the wall. A decorative member has a hole that receives the conduit such that the decorative member is mounted on the conduit between the mounting plate and the distal end of the conduit. The doorbell switch is receivably engaged with the conduit and the doorbell wiring extends through the conduit and is interconnected to the bell mechanism inside the wall.

In a preferred embodiment, the conduit includes an interior channel formed therethrough and the doorbell switch is received through the channel at the distal end of the conduit. There may be means for retaining the decorative member on the conduit. Such means for retaining may include an inner nut component threadably engaged with the conduit between the mounting plate and the decorative member. The means for retaining may also include an outer nut component threadably engaged with the conduit between the decorative member and the distal end of the conduit. The conduit preferably includes an exteriorly threaded pipe element.

A method of mounting a decorative doorbell apparatus to the wall of a building is also disclosed. Initially, a passageway is formed transversely through the wall. A mounting plate having an interiorly threaded opening is secured to the outside surface of the wall. The mounting plate is secured such that the threaded opening communicably corresponds with the passageway in the wall. An exteriorly threaded conduit is threadably engaged with the opening of the mounting plate such that the conduit is received in the passageway and extends outwardly from the plate to a distal end spaced apart from the wall. A decorative member is provided and a hole is formed therethrough. The decorative member's hole is engaged with the conduit to mount the decorative member on the conduit. Standard doorbell wiring is inserted through the conduit and an attached doorbell switch is secured to the distal end of the conduit. The wiring is operably interconnected with a standard doorbell mechanism located inside the wall. Again, nuts or other means may be provided to constrain the decorative member from moving longitudinally on the conduit. Before the decorative member is engaged with the conduit, the conduit may be threadably adjusted in the mounting plate so that the distance from the mounting plate to the distal end of the conduit is greater than the width of the decorative member.

DETAILED DESCRIPTION OF PREFERRED EMBODIMENTS

Other objects, features and advantages will occur from the following description of preferred embodiments and the accompanying drawings, in which.

Figure 1:
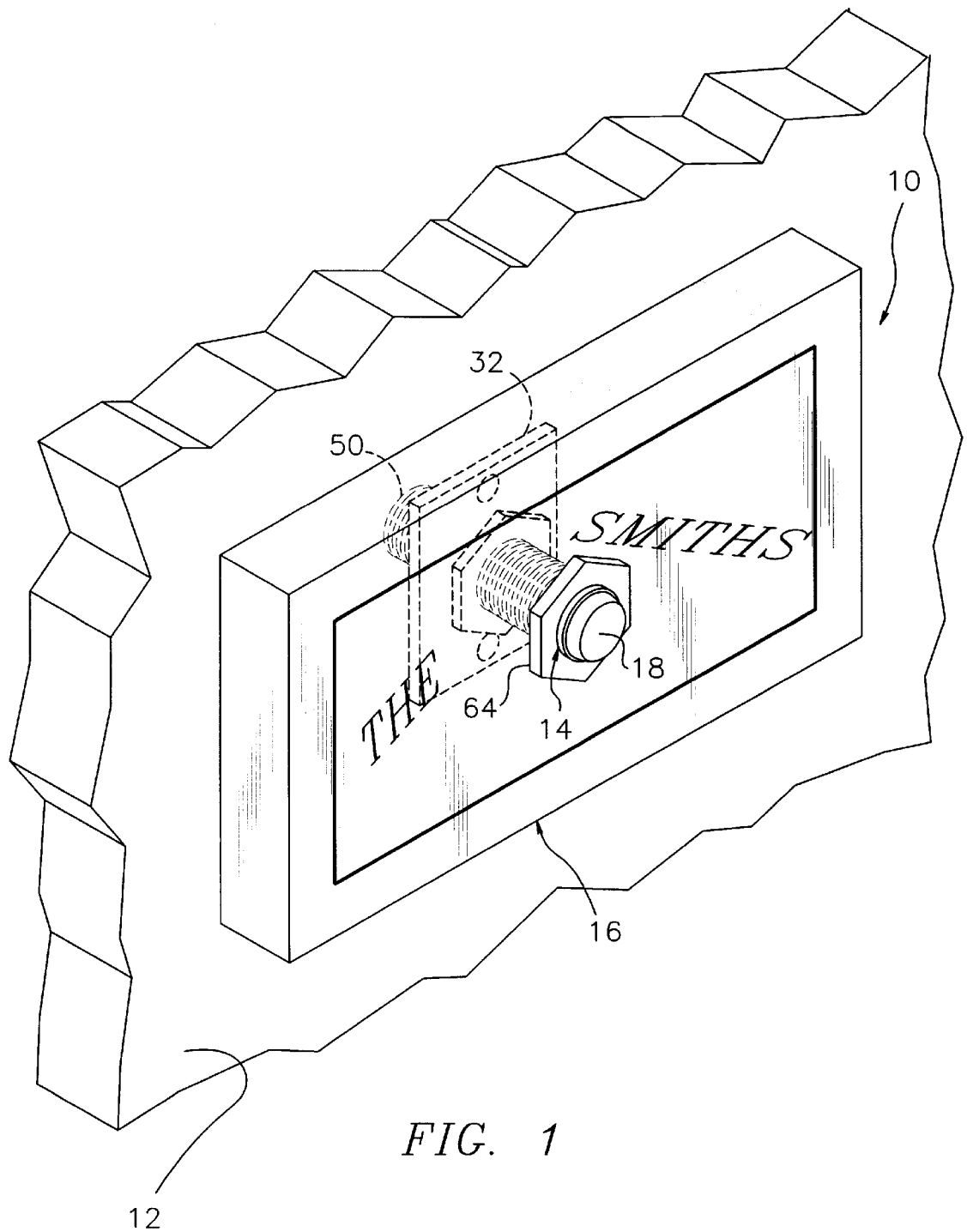
FIG. 1 is a perspective view of the decorative doorbell mounting assembly of this invention.
Figure 2:
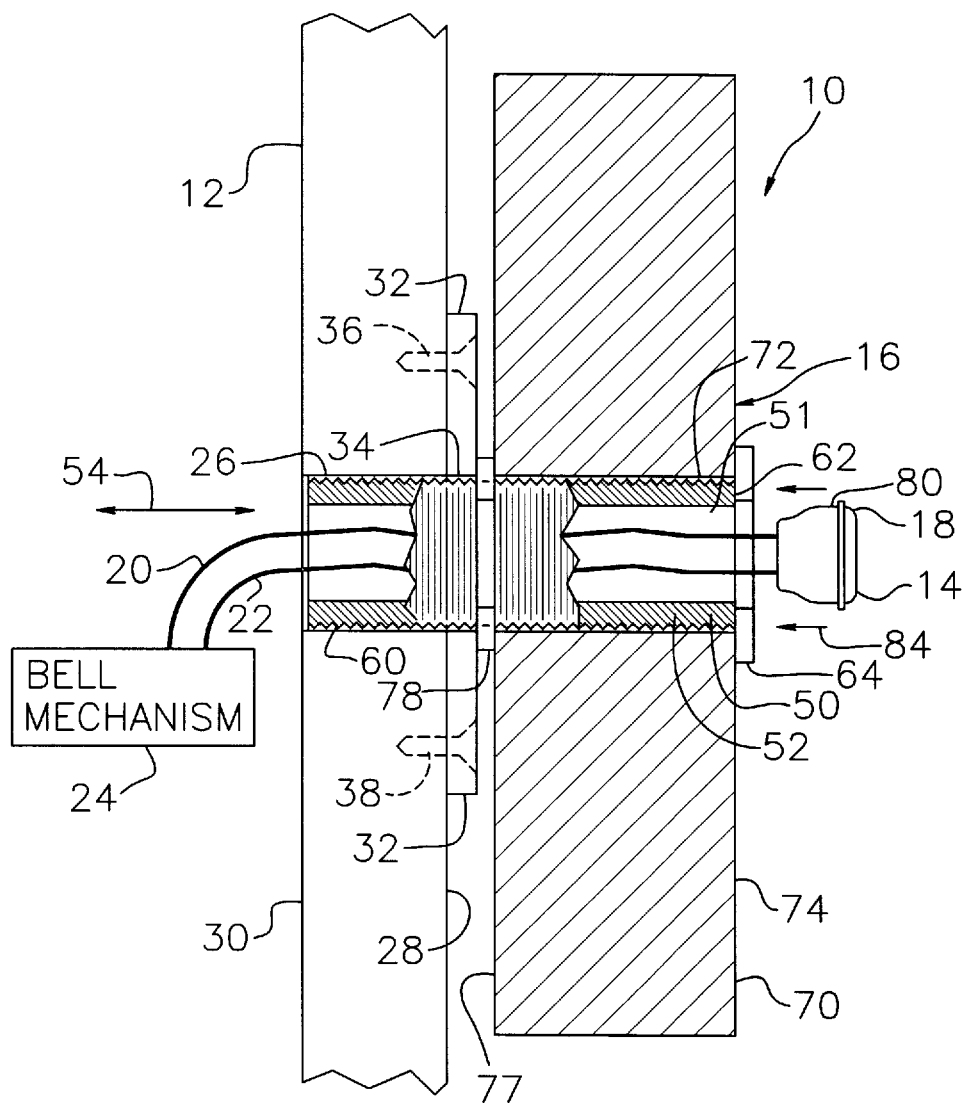
FIG. 2 is an elevational side view, partly cut away and partly in schematic, of a doorbell apparatus that employs the mounting assembly of this invention.

There is shown in FIGS. 1 and 2 a decorative doorbell apparatus 10, which is mounted to the outside wall 12 of a building. Apparatus 10 includes a standard doorbell 14 and an assembly 16 for mounting doorbell 14 onto wall 12. More particularly, the standard portion of the doorbell includes a doorbell button or switch 18 and a pair of doorbell wires 20 and 22, FIG. 2, which are operably connected to switch 14 in a known manner. The wires are likewise operably connected in a known manner to a conventional bell mechanism 24. This mechanism may comprise chimes or various other types of audible bell devices which will be well understood to those skilled in the art. Bell mechanism 24 is mounted in a known manner inside of the house. In the version disclosed herein, doorbell switch 14 is circular. In alternative embodiments of this invention, the doorbell switch may comprise rectangular or other non-circular shapes. In other versions, different types of wiring or electrical connections may be utilized to interconnect the switch and the bell mechanism.

In to the prior art, the doorbell switch is usually mounted directly to the building wall and the wiring is run through a hole or passageway in the wall. Likewise, in the present invention, a transverse passageway 26, FIG. 2, is formed through wall 12. Passageway 26 extends from the outside surface 28 to the inside surface 30 of wall 12. A generally flat mounting plate 32 is secured to outer wall surface 28. Plate 32, shown in FIGS. 1–3, has a generally rectangular shape, although other, non-rectangular shapes may be employed. A circular, interiorly threaded opening 34 is formed through plate 32. The mounting plate is secured to outside surface 28 of wall 12 by upper and lower screws or bolts 36 and 38. Screw 36 is interengaged with upper hole 40 in plate 32 and an aligned hole in building 12. Likewise, lower connector 38 is interengaged with lower plate hole 42 and an aligned hole in wall 12. Various other known means of attachment may be used for securing the plate to the wall. Opening 34 is positioned on plate 32 such that when the plate is secured to wall 12, threaded opening 34 communicably corresponds (i.e. is aligned) with passageway 26, in the manner best shown in FIG. 2.

Figure 3:
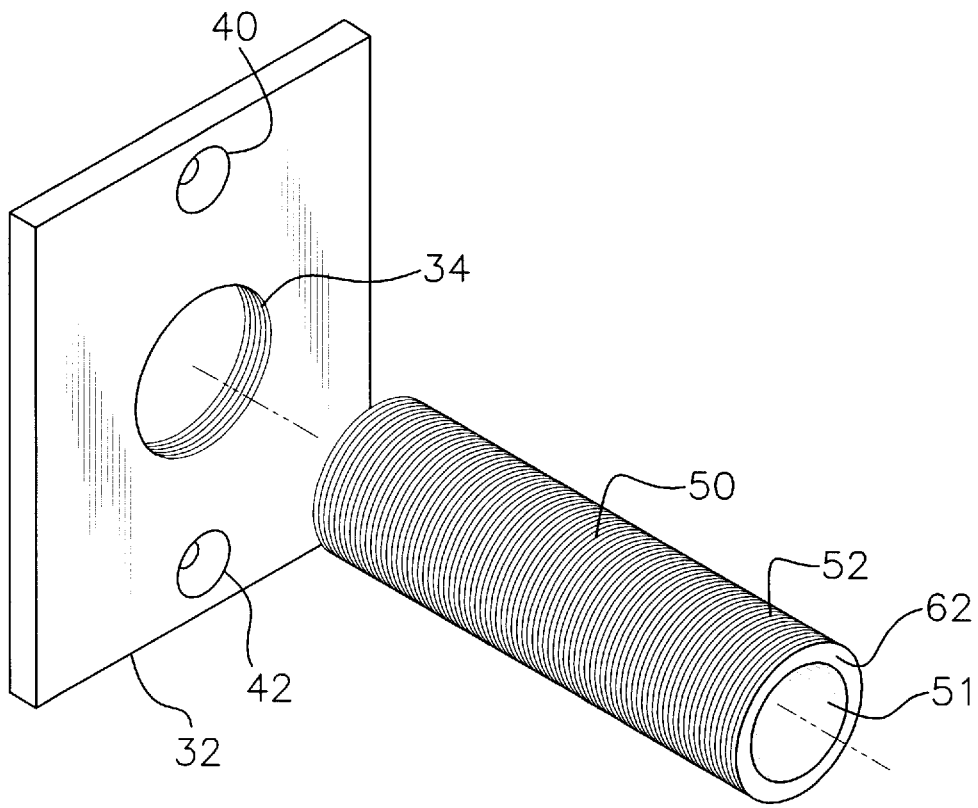
FIG. 3 is an exploded view of the mounting plate and the conduit.
Figure 4:
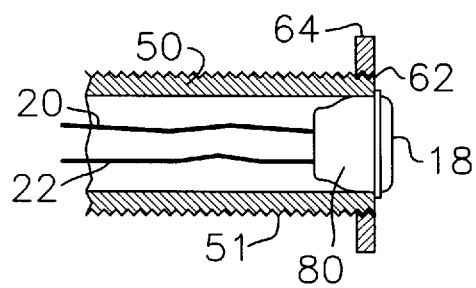
FIG. 4 is an elevational, cross sectional view of the distal end of the conduit with the doorbell switch attached thereto.

A cylindrical, exteriorly threaded conduit 50, FIGS. 1–4, is threadably interengaged with opening 34 in plate 32. Conduit 50 comprises a tube or pipe having an interior channel or passageway 51 and an exteriorly threaded outer surface 52. The threads in the outer surface of conduit 50 complement and are engagable with the threads on the interior surface of plate opening 34. This permits the conduit to be longitudinally adjusted within the plate as indicated by double headed arrow 54 in FIG. 2. The conduit has an outer diameter that is slightly less than the diameter of passageway 26 in wall 12. As best shown in FIG. 2, an inner end 60 of conduit 50 is received within passageway 26 and the conduit extends outwardly from mounting plate 32 to a distal end 62 that is spaced apart from the outside surface 28 of wall 12. In FIG. 2, distal end 62 is engaged and obscured by a nut 64, the function of which is described more fully below. Note, however, that distal end 62 is also shown in FIGS. 3 and 4. Conduit 50 is thereby mounted to and extends transversely outwardly from wall 12. Preferably, the components used in the plate and the conduit are formed from durable materials such as metals, metal alloys and rugged plastics.

A decorative member 70, FIGS. 1 and 2, is supported on conduit 50. In the embodiment shown herein, decorative member 70 is a name plaque, which identifies the residents of the home. In alternative embodiments, member 70 may comprise various types of decorative artwork featuring a wide and virtually unlimited assortment of designs. The decorative member is typically composed of wood, but may also comprise various types of plastics, metals and metal alloy materials. As best shown in FIG. 2, a hole 72 is formed transversely through member 70. The hole has a diameter that is slightly larger than the outside diameter of conduit 50. Member 70 is installed on conduit 50 by inserting the conduit through hole 72 such that the distal end 62 of the conduit extends slightly beyond the front surface 74 of member 70. The decorative member is held longitudinally in place on conduit 50 by previously described retaining nut 62, which is threadably engaged with conduit 50 on the front side of the decorative member and an optional second nut 78 that is threadably interengaged with the conduit between the outer face of plate 32 and the inside surface of decorative member 70. Nut 62 is tightened onto conduit 50 and against the front surface 74 of decorative member 70 such that the decorative member is held securely in place on the conduit and is prevented from moving longitudinally thereon. When the forward nut 62 is tightened in this manner, the back surface 77 of member 50 is drawn against nut 78, or alternatively, against the outer face of plate 32 in cases where the inner nut is not used.

Conduit channel 51 is provided with a diameter that snugly and frictionally receives the body 80 of doorbell switch 18. After decorative member 70 is installed on conduit 50, housing 80 is aligned with conduit opening 51 and pressed into that channel at distal end 62 of conduit 50, in the manner shown by arrows 84 in FIG. 2. As a result, the doorbell switch is frictionally retained within the conduit channel in the manner best shown in FIGS. 1 and 4. Switch 18 is thereby exposed from the forward end 62 of conduit 50 so that its button may be resiliently pushed to operate the doorbell in a standard manner. Wires 20 and 21 extend from switch 18 through channel 51 of conduit 50. As best shown in FIG. 2, the doorbell wires exit the inner end 60 of conduit 50 and are operably attached to bell mechanism 24.

To install doorbell apparatus 10, hole 26 is formed in wall 12 by a drill or other appropriate means. In most cases this hole is pre-formed when the house is constructed. Plate 32 is secured to the outer surface 28 of wall 12 so that threaded opening 34 is aligned with transverse passageway 26. The homeowner or other person installing the apparatus next threadably interengages conduit 50 with threaded opening 34 and adjusts the conduit longitudinally, through both mounting plate 32 and passageway 26, so that the conduit extends outwardly from plate 32 a distance that is greater than the thickness of the proposed decorative member 70. After the conduit is adjusted by a desired amount, nut 78 is attached and tightened against the outer surface of plate 32. The selected decorative member, having transverse hole 72 formed therein, is mounted to conduit 50 by inserting the conduit through hole 72. With member 70 supported on conduit 50, outer nut 64 is threadably attached to the conduit and tightened against the outer surface 74 of member 70. Doorbell wires 20 and 21 are then run through the conduit and attached to bell mechanism 24. Finally, doorbell switch 18 is attached by pressing housing 80 into conduit channel 51. The doorbell apparatus 10, as it appears in FIG. 1, is now ready for operation.

Subsequently, the decorative member 70 may be readily replaced and/or interchanged with alternative decorative members. For example, the decorative member may be changed for particular holidays, seasons or occasions, or to reflect a change in the occupants in the home. A wide variety of decorative plaques, signs and sculptural works may be utilized. To change member 70, the homeowner simply removes doorbell switch 18 from conduit 50 and disconnects the switch from the doorbell wires. Nut 64 is disengaged from conduit 50 and decorative member 70 is slid off of the conduit and replaced with a new decorative member. Nut 64 is then re-attached and switch 18 is reconnected to the wires and pressed back into the conduit channel.

Accordingly, the present invention provides a doorbell that is much more attractive than the plain standard doorbells currently in use. The decor of the doorbell may be quickly and conveniently changed to suit the particular homeowner's tastes and desires.

Although specific features of the invention are shown in some drawings and not others, this is for convenience only, as each feature may be combined with any or all of the other features in accordance with the invention. Other embodiments will occur to those skilled in the art and are within the following claims.

What is claimed is:

1. A decorative doorbell apparatus that is mounted to a building wall, said apparatus comprising:

a mounting plate secured to an outside surface of the wall and including a threaded opening that communicably corresponds with a passageway in the wall;

an elongate, exteriorly threaded conduit threadably interengaged with said opening of said mounting plate, said conduit being received within the passageway in the wall and extending outwardly from said plate to a distal end spaced apart from said wall;

a decorative member having a hole that receives said conduit such that said decorative member is mounted on said conduit between said plate and said distal end of said conduit; and a doorbell switch releasably engaged with said distal end of said conduit and connected to doorbell wiring, said wiring extends through said conduit and is operably connected to a standard bell mechanism located inside of said wall.

2. The apparatus of claim 1 in which said conduit includes an interior channel and said doorbell switch is received by said channel at said distal end of said conduit.

3. The apparatus of claim 1 further including means for retaining said decorative member longitudinally on said conduit.

4. The apparatus of claim 3 in which said means for retaining include an inner nut component threadably engaged with said conduit between said mounting plate and said decorative member.

5. The apparatus of claim 3 in which said means for retaining include an outer nut component threadably engaged with said conduit between said decorative element and said distal end of said conduit.

6. The apparatus of claim 1 in which said conduit includes an exteriorly threaded pipe element.

7. A decorative doorbell mounting assembly for mounting a doorbell switch to an the outside surface of a building wall such that the switch is operably interconnected by doorbell wiring to a standard bell mechanism located inside the wall, said wall having a passageway formed therethrough from the outside surface to an inside surface of the wall, said apparatus comprising:

a mounting plate secured to the outside surface of the wall and having a threaded opening that communicably corresponds with the passageway in the wall;

an exteriorly threaded conduit that is threadably interengaged with said opening in said mounting plate, said conduit being received by the passageway and extending outwardly from said plate to a distal end spread apart from the wall; and a decorative member having a hole that receives said conduit such that said decorative element is mounted on said conduit between said plate and said distal end of said conduit; the doorbell switch being releasably engaged with said conduit and the doorbell wiring extending through said conduit and being operably interconnected to the bell mechanism inside the wall.

8. The apparatus of claim 7 in which said conduit includes an interior channel and said doorbell switch is received by said channel at said distal end of said conduit.

9. The apparatus of claim 7 further including means for retaining said decorative member longitudinally on said conduit.

10. The apparatus of claim 9 in which said means for retaining include an inner nut component threadably engaged with said conduit between said mounting plate and said decorative member.

11. The apparatus of claim 9 in which said means for retaining include an outer nut component threadably engaged with said conduit between said decorative element and said distal end of said conduit.

12. The apparatus of claim 7 in which said conduit includes an exteriorly threaded pipe element.

13. A method of mounting a decorative doorbell apparatus to a wall of a building comprising the steps of:

forming a passageway transversely through the wall;

securing a mounting plate to an outside surface of the wall, said plate includes a threaded opening formed therethrough, said opening communicably corresponds with said passageway in the wall;

threadably interengaging an elongate, exteriorly threaded conduit with said opening of said mounting plate such that said conduit is received in the passageway and extends outwardly from the plate to a distal end spaced apart from the wall;

providing a decorative member and forming a hole therethrough;

engaging the decorative member hole with the conduit to mount the decorative member on the conduit;

providing a doorbell switch that includes attached doorbell wiring;

providing a bell mechanism inside the wall;

inserting the doorbell wiring through the conduit; and attaching the doorbell switch to the conduit.

14. The method of claim 13 further including the step of constraining the decorative member from moving longitudinally on the conduit.

15. The method of claim 13 further including the step of operably connecting the wiring to the bell mechanism.

16. The method of claim 13 further including the step of threadably adjusting the conduit within the hole of the mounting plate such that the conduit extends outwardly from the mounting plate a distance that is greater than a width of the decorative member.

* * * * *